(12) United States Patent
Lundstedt et al.

(10) Patent No.: US 11,428,180 B2
(45) Date of Patent: Aug. 30, 2022

(54) METHOD FOR CONTROLLING A VEHICLE PROPULSION SYSTEM

(71) Applicant: VOLVO TRUCK CORPORATION, Gothenburg (SE)

(72) Inventors: Björn Lundstedt, Lerum (SE); Anders Eriksson, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 264 days.

(21) Appl. No.: 16/625,599

(22) PCT Filed: Jun. 29, 2017

(86) PCT No.: PCT/EP2017/066195
§ 371 (c)(1),
(2) Date: Dec. 20, 2019

(87) PCT Pub. No.: WO2019/001721
PCT Pub. Date: Jan. 3, 2019

(65) Prior Publication Data
US 2021/0332767 A1    Oct. 28, 2021

(51) Int. Cl.
*F02D 41/02* (2006.01)
*F01N 3/02* (2006.01)
(Continued)

(52) U.S. Cl.
CPC .......... *F02D 41/029* (2013.01); *F01N 3/021* (2013.01); *F01N 9/002* (2013.01); *F01N 11/005* (2013.01); *F01N 2260/04* (2013.01); *F01N 2550/02* (2013.01); *F01N 2550/04* (2013.01); *F02D 2200/0804* (2013.01);
(Continued)

(58) Field of Classification Search
CPC .......... F02D 41/029; F02D 2200/0812; F02D 2200/701; F02D 2200/50; F02D 2200/702; F02D 2200/0804; F01N 3/021; F01N 9/002; F01N 11/005; F01N 2550/02;
(Continued)

(56) References Cited

U.S. PATENT DOCUMENTS

| 6,032,461 A | 3/2000 | Kinugasa et al. |
| 9,144,761 B2 * | 9/2015 | Quix .................. F02D 41/0245 |

(Continued)

FOREIGN PATENT DOCUMENTS

| CN | 1517520 A | 8/2004 |
| CN | 1519462 A | 8/2004 |

(Continued)

OTHER PUBLICATIONS

Machine Translation DE 10 2012 010189 (Year: 2021).*
(Continued)

*Primary Examiner* — Audrey B. Walter
*Assistant Examiner* — Dapinder Singh
(74) *Attorney, Agent, or Firm* — Venable LLP; Jeffri A Kaminski

(57) ABSTRACT

A method for controlling a vehicle propulsion system. More particularly, the method estimates a future, upcoming driving condition and controls the vehicle propulsion system to operate the prime mover in a specific operation mode based on a determined regeneration level of a particle filter for the estimated future, upcoming driving condition.

16 Claims, 2 Drawing Sheets

(51) Int. Cl.
  *F01N 9/00* (2006.01)
  *F01N 11/00* (2006.01)
  *F01N 3/021* (2006.01)

(52) U.S. Cl.
  CPC .. *F02D 2200/0812* (2013.01); *F02D 2200/50* (2013.01); *F02D 2200/701* (2013.01); *F02D 2200/702* (2013.01); *Y02T 10/12* (2013.01); *Y02T 10/40* (2013.01)

(58) Field of Classification Search
  CPC .. F01N 2550/04; F01N 2260/04; Y02T 10/12; Y02T 10/40
  See application file for complete search history.

(56) References Cited

U.S. PATENT DOCUMENTS

| | | | |
|---|---|---|---|
| 2013/0125529 A1 | 5/2013 | Ardanese et al. | |
| 2013/0125745 A1* | 5/2013 | Bromberg | B01D 46/444 95/14 |
| 2014/0238003 A1 | 8/2014 | Sase et al. | |
| 2016/0251012 A1* | 9/2016 | Schneider | F02D 41/0235 701/22 |
| 2017/0138283 A1* | 5/2017 | Pakko | F01N 3/031 |
| 2017/0159533 A1* | 6/2017 | Gerty | F01N 3/0231 |

FOREIGN PATENT DOCUMENTS

| | | |
|---|---|---|
| CN | 102191982 A | 9/2011 |
| CN | 103661386 A | 3/2014 |
| DE | 102012010189 A1 | 11/2012 |
| EP | 1647688 A1 | 4/2006 |
| JP | 2010190120 A | 9/2010 |
| WO | 03025355 A1 | 3/2003 |
| WO | 2011128543 A1 | 10/2011 |
| WO | 2016200320 A1 | 12/2016 |

OTHER PUBLICATIONS

International Search Report and Written Opinion dated May 18, 2018 in corresponding International PCT Application No. PCT/EP2017/066195, 9 pages.

China Office Action dated Aug. 27, 2021 in corresponding China Patent Application No. 201780092326.3, 21 pages.

\* cited by examiner

METHOD FOR CONTROLLING A VEHICLE PROPULSION SYSTEM

TECHNICAL FIELD

The present invention relates to a method for controlling a vehicle propulsion system. The invention also relates to a corresponding vehicle propulsion system. The invention is applicable on vehicles, in particularly low, medium and heavy duty vehicles commonly referred to as trucks. Although the invention will mainly be described in relation to a truck, it may also be applicable for other type of vehicles using particle filters, such as buses, working machines, etc.

BACKGROUND

During propulsion of a vehicle, such as a low, medium and heavy duty vehicle, also commonly referred to as a truck, an increased amount of fuel provided into the internal combustion engine via the fuel injection system generally results in an increased amount of soot particles in the combustion gases exhausted from the internal combustion engine. These soot particles are absorbed by a particle filter arranged downstream the internal combustion gases. Preferably, the internal combustion engine uses diesel as propulsion fuel, and in such a case, the particle filter can also be referred to as a Diesel Particulate Filter (DPF).

However, increasing the amount of soot particles, also referred to as particulate matter, the particle filter will be filled up to a limit at which the particle filter is less prone to absorb further particulate matter. The particle filter thus needs to be regenerated on a regular basis for providing a capacity of the filter to properly absorb further particulate matter. Regeneration of the particle filter is executed by oxidation of the particles contained in the particle filter. This can either be made by so-called passive regeneration at which the temperature level of the particle filter is increased naturally due to the operation of the vehicle, or by so-called active regeneration at which heat is actively added to the particle filter.

Passive regeneration is preferable in comparison to active regeneration. The reason is, for example, that active regeneration most often adds fuel to increase the temperature of the particle filter. This will thus increase the overall fuel consumption of the vehicle. Also, active regeneration may negatively affect the particle filter in terms of reduced overall functionality thereof.

It is therefore a desire to be able to control a vehicle propulsion system for reducing the need of performing active regeneration of the particle filter.

SUMMARY

It is an object of the present invention to provide a method for controlling a vehicle propulsion system which at least partially overcomes the above described deficiencies. This is achieved by a method according to claim 1.

According to a first aspect of the present invention, there is provided a method for controlling a vehicle propulsion system, the vehicle propulsion system comprising a prime mover for propelling a vehicle, and an exhaust gas system connected downstream the prime mover, wherein the exhaust gas system comprises a particle filter for removal of particulate matter contained in the combustion gases from the prime mover, wherein the method comprises the steps of determining a current capacity of the particle filter; estimating a future, upcoming driving condition for the vehicle; estimating a temperature level of the particle filter when exposing the vehicle to the upcoming driving condition; determining a regeneration level of the particle filter when the particle filter is exposed to the estimated temperature level; and if the regeneration level of the particle filter is above a predetermined threshold limit controlling the vehicle propulsion system to operate the prime mover in a first operating mode until the vehicle is exposed to the future, upcoming driving condition, the first operating mode allows the prime mover to exhaust combustion gases comprising an amount of particulate matter corresponding to the current capacity of the particle filter.

The wording "capacity" of the particle filter should in the following context be understood to mean the amount of particles the filter is able to absorb, as will be described further below. The current capacity is thus the capacity from a present point in time, i.e. the "available space" for particulate matter in the particle filter. The amount of particles in the filter may, for example, be measured in the weight of particles. The capacity of the particle filter may be updated continuously during operation of the vehicle. The capacity may also be dependent on an approximation of how much particles that will be oxidized on the journey until the vehicle is exposed to the future, upcoming driving condition. Thus, if it is determined/estimated that the particle filter will be regenerated before the vehicle is exposed to the future, upcoming driving condition, the total capacity of the particle filter may be higher as particles will be oxidized during the travel.

Furthermore, the regeneration level should be understood to mean the amount of particles that will be oxidized in the particle filter when the filter is exposed to the increased temperature level.

Moreover and as will be described further below, the future, upcoming driving condition may relate to a specific condition of the vehicle that is estimated to take place at an upcoming point in time. Such condition may e.g. relate to an uphill slope having an inclination above a predetermined level, or that the vehicle will receive a load, or be connected to a trailer, etc.

Furthermore, the "first operating mode" should be understood to mean a mode where the propulsion system is operated in a way that a relatively large amount of particulate matter is exhausted in the combustion gases. Hence, when operating the propulsion system in the first operating mode, the particle filter will be filled up with particulate matter. According to non-limiting examples, the first operating mode may be realized by allowing an increased amount of fuel to be provided to the prime mover, lower pressure of the injected fuel, providing fuel injection to the prime mover at an early point in time, etc.

Also, the predetermined threshold limit for the regeneration level of the particle filter may be different depending on e.g. the current driving situation, as will be described further below. For example, and as will also be described below, the vehicle propulsion system may be controlled to be operated in the first operating mode only if it is estimated that the total amount of particulate matter contained in the particle filter is oxidized after exposing the vehicle to the upcoming driving condition. As an alternative, the vehicle propulsion system may be controlled to be operated in the first operating mode if only a low amount of particulate matter contained in the particle filter is estimated to be oxidized when exposing the vehicle to the upcoming driving condition.

The present invention is based on the insight that if it can be determined that an upcoming driving condition for the vehicle is such that passive regeneration of the particle filter will be performed, the vehicle propulsion system can be allowed to be operated in the first operating mode from the present point in time to the position where the vehicle will be exposed to the upcoming driving condition. Hence, the vehicle propulsion system is allowed to fill up the particle filter with particulate matter since an estimation is made that passive regeneration of the filter will be performed in due time. An advantage is thus that vehicle propulsion system is controlled to passively regenerate the particle filter and still allow the vehicle to be driven at a condition where an increasing amount of soot particles is generated in the combustion process of the prime mover. By being able to operate the vehicle propulsion system in the first operation mode, there is a reduced need of limit fueling of the prime mover and a reduced need to reduce the power consumption of the prime mover. Also, a reduced need for addition of a reduction agent such as Urea to the exhausted combustion gases is provided.

According to an example embodiment, the method may further comprise the step of controlling the vehicle propulsion system to operate the prime mover in a second operating mode if the regeneration level of the particle filter is below the predetermined threshold limit.

Hereby, the propulsion system can be controlled to be operated such that a low amount of particulate matter is exhausted from the combustion gases. The second operating mode should thus be understood as an operating mode at which low amounts of, or no, particulate matter is contained in the exhausted combustion gases. The second operating mode may be realized by limiting the fuel delivered to the prime mover, increase the pressure of the fuel injected to the prime mover, providing fuel injection to the prime mover at a later point in time, etc. The second operating mode may also be realized by increasing the number of injection pulses for delivery of fuel to the prime mover.

According to an example embodiment, the current capacity of the particle filter may correspond to a maximum amount of particulate matter collectable by the particle filter. Hereby, operation of the vehicle propulsion system can be controlled based on the absorption level of the particle filter. The absorption level may be based on the weight of particulate matter that can be filled into the particle filter before the filter is substantially unable to receive further particulate matter and is in need of regeneration.

According to an example embodiment, the current capacity of the particle filter may be continuously updated until the vehicle is exposed to the future, upcoming driving condition.

Hereby, operation of the vehicle propulsion system may be changed from the first operating mode to the second operating mode, or vice versa, depending on updated information regarding the current capacity of the particle filter. Updated information regarding the future, upcoming driving condition may also be continuously received, which may affect the operation of the vehicle propulsion system.

According to an example embodiment, the step of determining the current capacity of the particle filter may further comprise the step of determining a current amount of particulate matter contained in the particle filter.

Hereby, an initial level of particulate matter contained in the particle filter is determined.

According to an example embodiment, the predetermined threshold limit may correspond to the amount of particulate matter contained in the particle filter when the vehicle arrives at the position for the future, upcoming driving condition.

Hereby, and as described above, the vehicle propulsion system is controlled to be operated in the first operating mode if it is determined that the particle filter will be fully regenerated when the vehicle is exposed to the future, upcoming driving condition.

According to an example embodiment, the future, upcoming driving condition may be a first driving condition, wherein the method further comprises the steps of estimating a future, upcoming second driving condition ahead of the first driving condition; estimating a second temperature level of the particle filter when exposing the vehicle to the second upcoming driving condition; determining that the second temperature level is sufficient for at least partially regenerating the particle filter; and setting the predetermined threshold limit to correspond to the amount of particulate matter provided to the particle filter when controlling the vehicle propulsion system to operate the prime mover in the first operating mode between the position of the first driving condition and the position of the second driving condition.

Hereby, the particle filter does not necessarily have to be fully regenerated when the vehicle is exposed to the first driving condition. It may hence be sufficient that the particle filter is partly regenerated and that the capacity of the filter thereafter is sufficient to operate the vehicle in the first operating mode until the vehicle arrives at the future, upcoming second driving condition.

According to an example embodiment, the step of determining the future, upcoming driving condition for the vehicle may comprise the step of receiving a signal indicative of the future, upcoming driving condition, the signal corresponds to data from at least one of a GPS, logged road data, logged drive data or a map comprising data for the road ahead.

Hereby, various alternatives of determining the future, upcoming driving condition for the vehicle is provided. Logged drive data may correspond to the coming driving condition of the vehicle. For example, logged drive data may relate to information of the weight of a trailer that will be coupled to the vehicle at a position ahead of the vehicle. Such weight may increase the temperature level of the particle filter to levels where the particle filter will be exposed to passive regeneration. The logged drive data may also relate to statistical information of how vehicles have been driven at specific road portions at earlier points in time. Hereby, the temperature level of the particle filter can be determined based on how vehicles have previously been operated on the specific road portion ahead of the vehicle.

According to an example embodiment, the future, upcoming driving condition may correspond to the characteristics of the road topography ahead of the vehicle.

The road topography may be received from a map or the like. Hereby, uphill and downhill driving can be determined. In particular, uphill driving where the temperature level of the particle filter will be increased can be determined.

According to an example embodiment, the characteristic of the road ahead of the vehicle may correspond to an uphill slope having an inclination larger than a predetermined threshold angle.

The predetermined threshold angle may thus be such as to cause the vehicle to be operated in a way that will increase the temperature level of the particle filter to a level where the particle filter will be exposed to passive regeneration.

According to an example embodiment, the future, upcoming driving condition may correspond to an increase in weight of the vehicle.

The vehicle should in this context include a towing unit with or without the towed unit attached thereto. Hereby, the towed unit may be coupled to the towing unit when arriving at the future, upcoming driving condition, which will thus increase the weight of the vehicle. The increase in weight of the vehicle may also be caused by the towed unit and/or towing unit receiving a load when the vehicle arrives at the future, upcoming driving condition.

According to an example embodiment, the step of estimating the temperature level of the particle filter comprises the steps of determining a power level of the prime mover for propelling the vehicle at a predetermined speed at the upcoming driving condition; determining a temperature level of the combustion gases exhausted from the prime mover when exposed to the determined power level; and estimating the temperature level of the particle filter based on the determined temperature level of the combustion gases.

Hereby, the temperature level of the particle filter can be based on how the temperature levels of the exhausted combustion gases will vary when exposing the vehicle to the specific type of driving condition. The estimation of the temperature level of the particle filter can be made by receiving temperature data from previous similar situations, etc.

According to a second aspect, there is provided a vehicle propulsion system comprising a prime mover for propelling a vehicle, an exhaust gas system connected downstream the prime mover, the exhaust gas system comprising a particle filter for removal of particulate matter contained in the combustion gases from the prime mover, wherein the vehicle propulsion system further comprises a control unit configured to determine a current capacity of the particle filter; estimate a future, upcoming driving condition for the vehicle; estimate a temperature level of the particle filter when exposing the vehicle to the upcoming driving condition; determine a regeneration level of the particle filter when the particle filter is exposed to the estimated temperature level; and if the regeneration level of the particle filter is above a predetermined threshold limit: control the vehicle propulsion system to operate the prime mover in a first operating mode until the vehicle is exposed to the future, upcoming driving condition, the first operating mode allows the prime mover to exhaust combustion gases comprising an amount of particulate matter corresponding to the current capacity of the particle filter.

Effects and features of the second aspect are largely analogous to those described above in relation to the first aspect.

According to a third aspect, there is provided a computer program comprising program code means for performing any of the steps described above in relation to the first aspect when the program is run on a computer.

According to a fourth aspect, there is provided a computer readable medium carrying a computer program comprising program means for performing any of the steps described above in relation to the first aspect when the program means is run on a computer.

According to a fifth aspect, there is provided a vehicle comprising a vehicle propulsion system according to the above description in relation to the second aspect for propelling the vehicle.

Effects and features of the third, fourth and fifth aspects are largely analogous to those described above in relation to the first and second aspects.

In the context of the above description, the control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
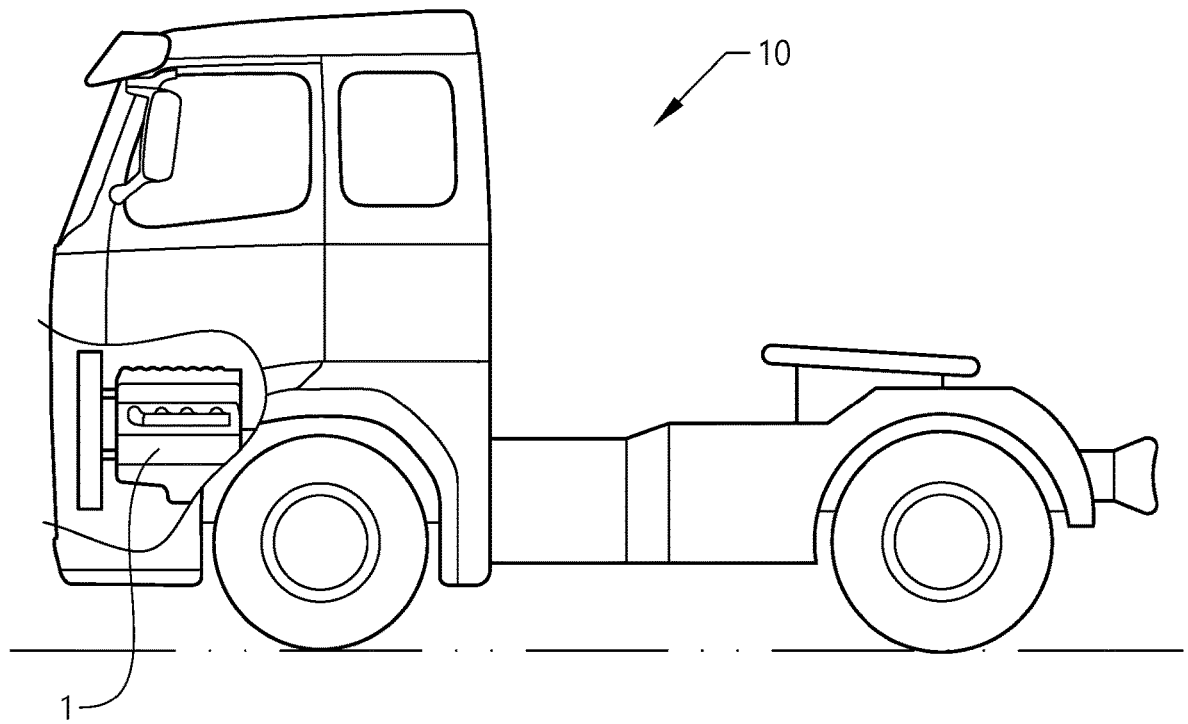
FIG. 1 is a lateral side view illustrating an example embodiment of a vehicle in the form of a truck.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 10 in the form of a truck. The vehicle 10 comprises a vehicle propulsion system (see FIG. 2) comprising a prime mover 1 in the form of an internal combustion engine. The prime mover 1 may be a propelled by e.g. a conventional fuel such as diesel.

Figure 2:
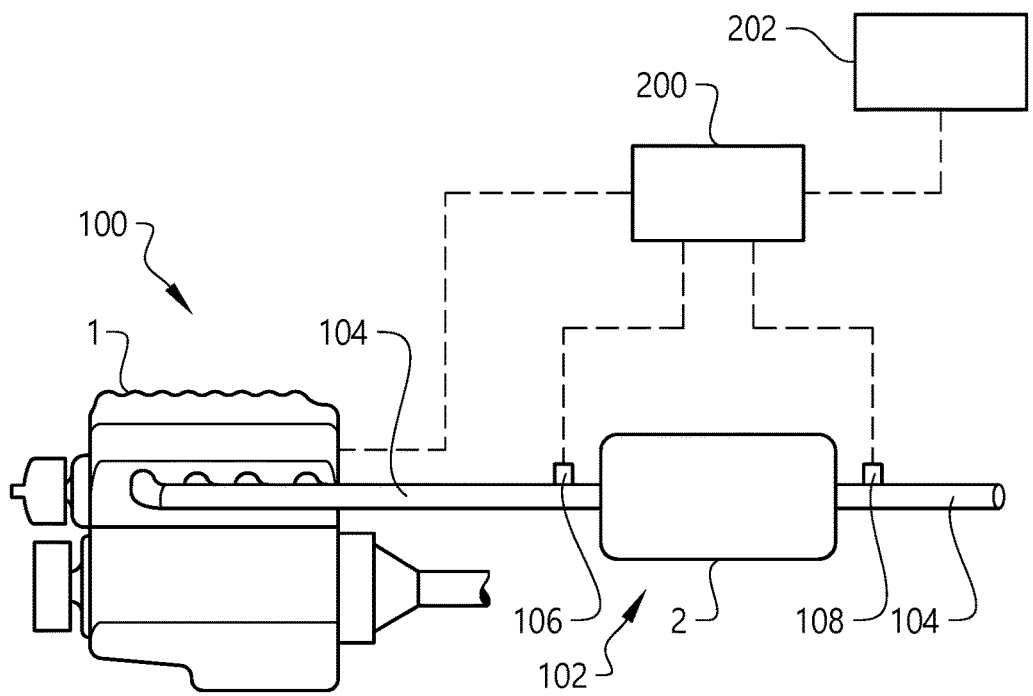
FIG. 2 schematically illustrates a vehicle propulsion system according to an example embodiment.

In order to describe the vehicle propulsion system in further detail, reference is made to FIG. 2. FIG. 2 schematically illustrates the vehicle propulsion system 100 according to an example embodiment. It should be readily understood that a plurality of components of the vehicle propulsion system 100 has been omitted from FIG. 2 in order to simplify understanding of the parts mostly relevant for the present disclosure.

As can be seen in FIG. 2, the vehicle propulsion system 100 comprises the above described prime mover 1, an exhaust gas system 102 arranged downstream the prime mover 1. Hence, the exhaust gas system 102 is positioned to receive combustion gases exhausted from the prime mover 1 during operation thereof. The exhaust gas system 102 further comprises a particle filter 2 arranged downstream the prime mover 1 via an exhaust conduit 104. The particle filter 2 is thus arranged to absorb particulate matter generated in the combustion process of the prime mover 1 and exhausted in the combustion gases through the exhaust conduit 104.

The vehicle propulsion system 100 further comprises a first 106 and a second 108 temperature sensor, wherein the first temperature sensor 106 is arranged at the exhaust conduit 104 upstream the particle filter 2 and the second temperature sensor 108 is arranged at the exhaust conduit 104 downstream the particle filter 2. The first 106 and second 108 particle filters must not necessarily be arranged on the exhaust conduit 104, and can be arranged at other positions as long as they are able to detect a temperature level upstream and downstream the particle filter 2. By means of the temperature sensors it is possible to determine the temperature level of the particle filter 2.

Moreover, the vehicle propulsion system 100 further comprises a control unit 200. The control unit 200 is, according to the example embodiment depicted in FIG. 2, connected to the first 106 and second 108 temperature sensors for receiving temperature data therefrom. Hereby, the control unit 200 can determine the temperature level of the particle filter 2. In turn, the control unit 200 can determine if the particle filter 2 has been exposed to passive regeneration, and to what extent. Passive and active regeneration of the particle filter 2 is described in further detail below.

Moreover, the control unit 200 is also connected to the prime mover 1 or to an engine control unit (not shown) of the prime mover 1 for controlling operation of the prime mover 1. As further depicted in FIG. 2, the control unit 200 is also connected to a driving condition estimator 202. The driving condition estimator 202 is arranged to estimate a future, upcoming driving condition for the vehicle 10. The driving condition estimator 202 may, for example comprise a GPS, logged road data, logged drive data or map data comprising topography data of the road ahead of the vehicle, etc.

During operation of the vehicle 10, the combustion gases exhausted from the prime mover 1 will contain a various amount of particulate matter depending on how the prime mover is operated. If, for example, the vehicle 10 is driven for long period of time at a relatively high speed, the amount of particulate matter will be larger in comparison to city driving of the vehicle, which is often associated with low vehicle speed and low speed of revolution of the prime mover 1. Also, the amount of soot particles will increase based on accelerator pedal input, such as by relatively fast power build up after a new gear is engaged, etc.

If the amount of particulate matter is high, the particle filter will naturally be relatively quickly filled to its maximum capacity. When the particle filter 2 is filled to its maximum level, it will be in need of regeneration before being able to properly absorb further particulate matter. The regeneration of the particle filter 2 can either be executed passively or actively. When regenerating the particle filter 2 passively, the particle filter 2 is exposed to temperature levels caused by the specific operation of the vehicle 10. Hence, passive regeneration is executed "naturally" as the temperature level of the particle filter 2 exceeds a temperature limit at which particulate matter contained in the particle filter is oxidized, i.e. burns off. The temperature levels of the particle filter may exceed the temperature limit when e.g. driving the vehicle at an uphill slope, or when the vehicle is heavy loaded, etc.

However, if the vehicle 10 is operated such that the particle filter 2 is not exposed to passive regeneration before being filled with particulate matter to a maximum extent, active regeneration may be necessary to reduce the level of particulate matter in the particle filter 2. Active regeneration can be achieved by actively increasing the temperature levels of the exhaust gases. This can, for example, be accomplished by means of a fuel burner or fuel injection, etc. Active regeneration is thus often associated with adding of fuel which will increase the fuel consumption whereby passive regeneration is preferable. The following will therefore focus on describing operation of the vehicle 10 such that the particle filter will be exposed to passive regeneration.

Figure 3:
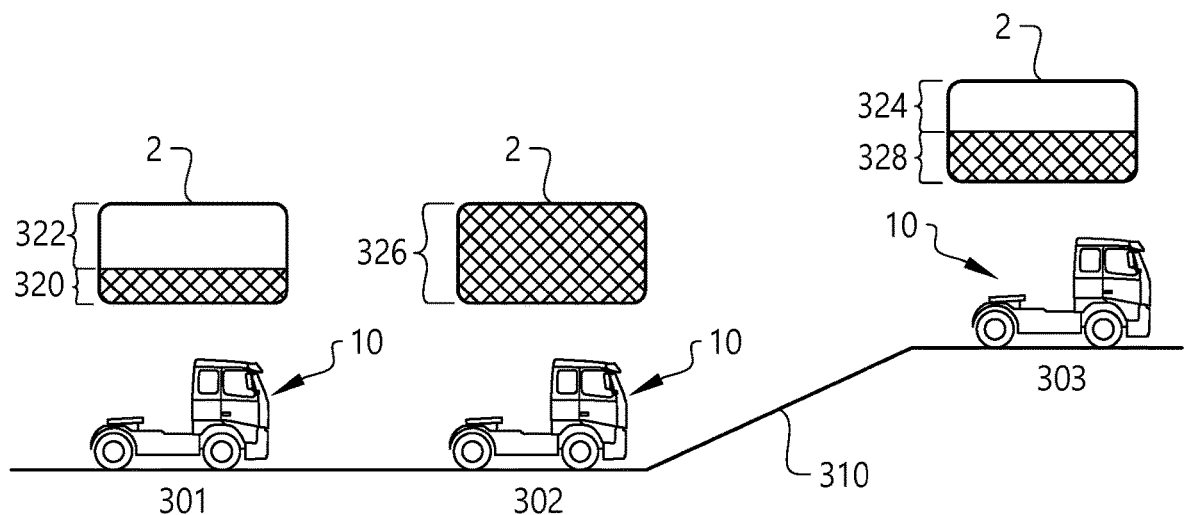
FIG. 3 schematically illustrates a driving scenario for operating vehicle propulsion system according to an example embodiment, and FIG. 4 schematically illustrates an example embodiment of a flow chart for controlling the vehicle propulsion system in FIG. 3.

Reference is made to FIG. 3 which schematically illustrates a driving scenario for the vehicle 10 according to an example embodiment. As can be seen in FIG. 3, the vehicle 10 is arranged at three different positions. These positions are illustrated with numerals 301, 302 and 303. In more detail, the vehicle is arranged at a first position 301, which may be referred to as a starting position. The vehicle 10 has a planned route which is estimated by the driving condition estimator 202 illustrated in FIG. 2. Thus, when starting at the first position 301, the control unit 200 receives information for estimating that the vehicle 10 will be driven at an upward slope 310 at a second position 302. The upward slope 310, which is initiated at the second position 302 thus corresponds to the future, upcoming driving condition for the vehicle 10. On top of the slope 310, the vehicle 10 arrives at a third position 303.

The particle filter 2 described above in relation to the description of FIG. 2 is also schematically illustrated in FIG. 3 for each of the first 301, second 302 and third 303 positions. FIG. 3 schematically depicts the amount of particulate matter contained in the particle filter 2 for each of the first 301, second 302 and third 303 positions according to an example embodiment.

As can be seen in FIG. 3, when the vehicle 10 is arranged at the first position 301, the particle filter 2 comprises a first amount 320 of particulate matter. The particle filter 2 thus has a first capacity 322 which corresponds to the difference between a maximum capacity and the first amount 320 of particulate matter provided in the particle filter 2. As described above, the control unit 200 has estimated that the vehicle will arrive at the slope 310 on its way to the final destination. Furthermore, the control unit 200 estimates a temperature level of the particle filter 2 when the vehicle is driven up the upward slope 310. Hereby, the control unit 200 can determine a regeneration level 324 of the particle filter 2 when the vehicle has arrived at the third position 303 on the crest of the upward slope 310. The regeneration level 324 corresponds to the amount of particulate matter in the particle filter 2 that will be oxidized, i.e. burned off when driving the upward slope 310. If the regeneration level 324 is sufficient, i.e. above a predetermined threshold limit, it can be determined that the vehicle propulsion system 100 can be controlled to operate the prime mover 1 to such an extent that the particle filter 2 is filled with particulate matter to a substantially maximum level 326 when the vehicle arrives at the second position 302. As it is determined that passive regeneration of the particle filter 2 will take place when driving the vehicle 10 at the upward slope 310, it is determined to be ok to fill the particle filter 2 with particulate matter on its journey towards the upward slope 310. The regeneration level 324 depicted at the third position 303 does not correspond to a completely burned out particle filter, i.e. the particle filter 2 still contains particulate matter. This is in FIG. 3 illustrated as a second amount 328 of particulate matter. It should however be understood that the particle filter 2 may be completely regenerated once the vehicle arrives at the third position 303 on the crest of the upward slope 310.

Although FIG. 3 illustrates the future, upcoming driving condition in the form of an upward slope 310, other alternative future, upcoming driving conditions are also conceivable, such as e.g. a loading station where the weight of the vehicle will increase, or a loading station where the towing unit of the vehicle 10 will be connected to a towed unit provided with heavy loading, etc.

Figure 4:
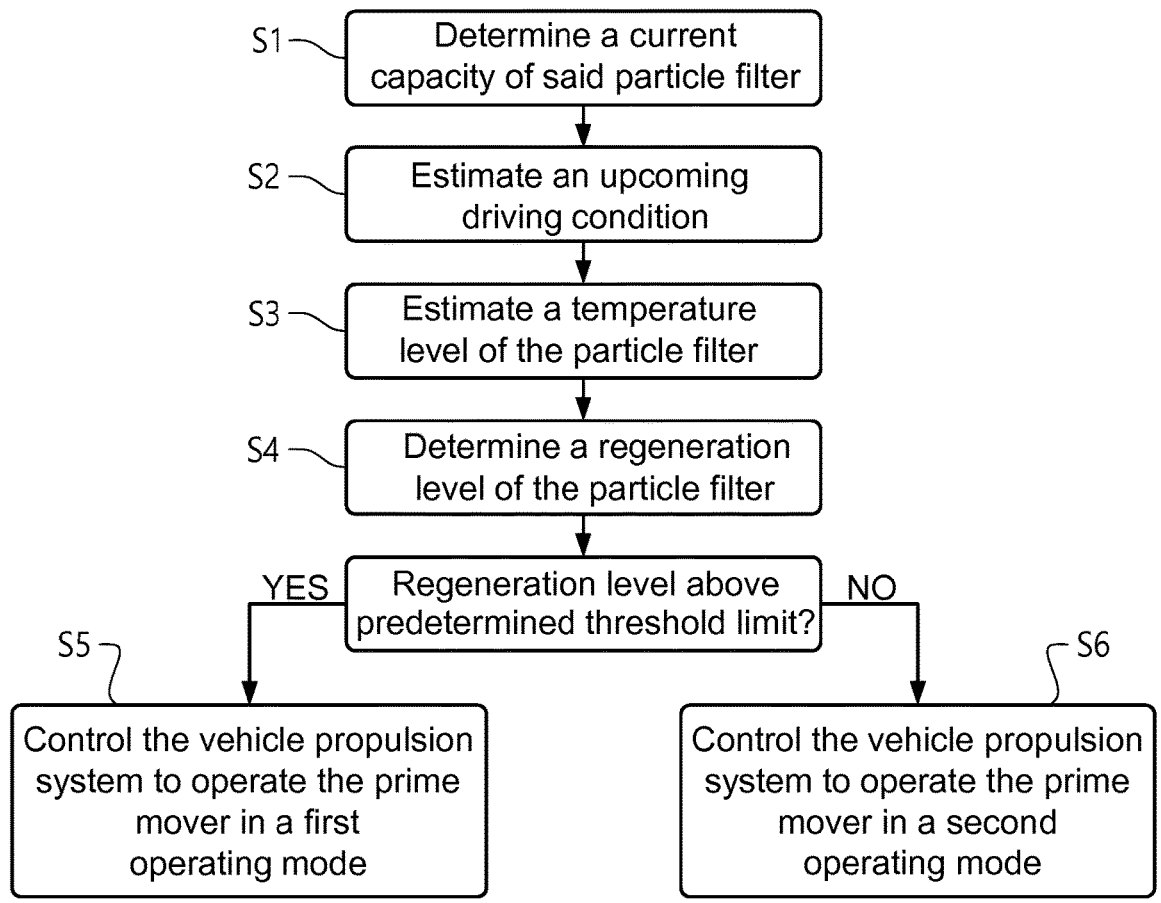

In order to sum up, reference is made to FIG. 4 in combination with FIG. 3. When the vehicle 10 is operated, the current capacity 322, also referred to above as the first capacity, of the particle filter 2 is determined S1. A future, upcoming driving condition for the vehicle 10 is thereafter determined S2. Hereby, it can be determined if the vehicle 10 will be driven up an upward slope 310 or provided with an increased load, etc. The control unit 200 thereafter estimates S3 a temperature level that the particle filter 2 will be exposed to when the vehicle 10 is driven at the upward slope 310. By means of this estimated temperature level of the particle filter 2, a regeneration level of the particle filter 2 is determined S4. Hence, it is determined how much particulate matter in the particle filter that will be oxidized when the particle filter 2 is exposed to the estimated temperature level.

Depending on whether the regeneration level is above or below a predetermined threshold limit, i.e. depending on the amount of particulate matter contained in the particle filter that is determined to be oxidized when the particle filter is exposed to the estimated temperature level, the vehicle propulsion system can be controlled to operate the prime mover in either the first or the second operating mode.

In detail, if the regeneration level of the particle filter is above the predetermined threshold limit, the vehicle propulsion system 100 is controlled S5 to operate the prime mover 1 in the first operating mode until the vehicle arrives at the future, upcoming driving condition. Hereby, the prime mover 1 is allowed to be operated such that a relatively large amount of particulate matter is contained in the exhausted combustion gases.

On the other hand, if the regeneration level of the particle filter is below the predetermined threshold limit, the vehicle propulsion system 100 is controlled S6 to operate the prime mover 1 in the second operating mode. Hereby, the prime mover 1 is prevented from being operated to exhaust combustion gases containing particulate matter, or only allowed to be operated such that the exhausted combustion gases contains a small amount of particulate matter.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

The invention claimed is:

1. A method for controlling a vehicle propulsion system, the vehicle propulsion system comprising a prime mover for propelling a vehicle, and an exhaust gas system connected downstream the prime mover, wherein the exhaust gas system comprises a particle filter for removal of particulate matter contained in combustion gases from the prime mover, the method comprising the steps of:
   determining a current capacity of said particle filter;
   estimating a future, upcoming driving condition for the vehicle;
   estimating a temperature level of the particle filter when exposing the vehicle to the upcoming driving condition;
   determining a regeneration level of the particle filter when the particle filter is exposed to the estimated temperature level, the regeneration level being an amount of particles oxidized when the particle filter is exposed to the estimated temperature level; and if the regeneration level of said particle filter is above a predetermined threshold limit:
   controlling the vehicle propulsion system to operate the prime mover in a first operating mode until the vehicle is exposed to the future, upcoming driving condition, the first operating mode allows the prime mover to exhaust combustion gases comprising an amount of particulate matter corresponding to the current capacity of the particle filter.

2. The method according to claim 1, further comprising the step of:
   controlling the vehicle propulsion system to operate the prime mover in a second operating mode if the regeneration level of the particle filter is below the predetermined threshold limit.

3. The method according to claim 1, wherein the current capacity of the particle filter corresponds to a maximum amount of particulate matter collectable by the particle filter.

4. The method according to claim 1, wherein the current capacity of the particle filter is continuously updated until the vehicle is exposed to the future, upcoming driving condition.

5. The method according to claim 1, wherein the step of determining the current capacity of the particle filter further comprises the step of:
   determining a current amount of particulate matter contained in the particle filter.

6. The method according to claim 1, wherein the predetermined threshold limit corresponds to the amount of particulate matter contained in the particle filter when the vehicle arrives at a position for the future, upcoming driving condition.

7. The method according to claim 1, wherein the future, upcoming driving condition is a first driving condition, the method further comprising the steps of:
   estimating a future, upcoming second driving condition ahead of the first driving condition;
   estimating a second temperature level of the particle filter when exposing the vehicle to the second upcoming driving condition;
   determining that the second temperature level is sufficient for at least partially regenerating the particle filter; and
   setting the predetermined threshold limit to correspond to the amount of particulate matter provided to the particle filter when controlling the vehicle propulsion system to operate the prime mover in the first operating mode between a position of the first driving condition and a position of the second driving condition.

8. The method according to claim 1, wherein the step of determining the future, upcoming driving condition for the vehicle comprises the step of:

receiving a signal indicative of the future, upcoming driving condition, the signal corresponds to data from at least one of a GPS, logged road data, logged drive data or from a map comprising data for a road ahead.

9. The method according to claim 1, wherein the future, upcoming driving condition corresponds to a characteristic of a road topography ahead of the vehicle.

10. The method according to claim 9, wherein the characteristic of the road ahead of the vehicle corresponds to an uphill slope having an inclination larger than a predetermined threshold angle.

11. The method according to claim 1, wherein the future, upcoming driving condition corresponds to an increase in weight of the vehicle.

12. The method according to claim 1, wherein the step of estimating the temperature level of the particle filter comprises the steps of:
    determining a power level of the prime mover for propelling the vehicle at a predetermined speed at the upcoming driving condition;
    determining a temperature level of the combustion gases exhausted from the prime mover when exposed to the determined power level; and
    estimating the temperature level of the particle filter based on the determined temperature level of the combustion gases.

13. A computer program comprising program code means for performing the steps of claim 1 when the program is run on a computer.

14. A computer readable medium carrying a computer program comprising program means for performing the steps of claim 1 when the program means is run on a computer.

15. A vehicle propulsion system comprising a prime mover for propelling a vehicle, an exhaust gas system connected downstream the prime mover, the exhaust gas system comprising a particle filter for removal of particulate matter contained in combustion gases from the prime mover, wherein the vehicle propulsion system further comprises a control unit configured to:
    determine a current capacity of the particle filter;
    estimate a future, upcoming driving condition for the vehicle;
    estimate a temperature level of the particle filter when exposing the vehicle to the upcoming driving condition;
    determine a regeneration level of the particle filter when the particle filter is exposed to the estimated temperature level, the regeneration level being an amount of particles oxidized when the particle filter is exposed to the estimated temperature level; and if the regeneration level of the particle filter is above a predetermined threshold limit:
    control the vehicle propulsion system to operate the prime mover in a first operating mode until the vehicle is exposed to the future, upcoming driving condition, the first operating mode allows the prime mover to exhaust combustion gases comprising an amount of particulate matter corresponding to the current capacity of the particle filter.

16. A vehicle comprising a vehicle propulsion system according to claim 15 for propelling the vehicle.

* * * * *